United States Patent [19]

Schneider

[11] 4,049,890

[45] Sept. 20, 1977

[54] LITHIUM-IODINE CELLS AND METHOD FOR MAKING SAME

[75] Inventor: Alan A. Schneider, Reisters Town, Md.

[73] Assignee: Catalyst Research Corporation, Baltimore, Md.

[21] Appl. No.: 708,915

[22] Filed: July 26, 1976

Related U.S. Application Data

[63] Continuation of Ser. No. 564,755, April 3, 1975, abandoned.

[51] Int. Cl.$^2$ .............................................. H01M 6/18
[52] U.S. Cl. .................................. 429/181; 429/199; 429/213; 429/218; 429/192
[58] Field of Search ............... 429/181, 199, 213, 218, 429/212, 163, 192, 185

[56] References Cited

U.S. PATENT DOCUMENTS

| | | | |
|---|---|---|---|
| 3,653,968 | 4/1972 | Louzos | 429/191 |
| 3,674,562 | 7/1972 | Schneider et al. | 429/192 |
| 3,723,183 | 3/1973 | Greatbatch | 429/185 |

*Primary Examiner*—Anthony Skapars
*Attorney, Agent, or Firm*—Thomas C. Wettach

[57] ABSTRACT

A lithium iodine primary cell is provided that comprises a lithium anode encasing member having an aperture therethrough. Positioned within the anode encasing member is a cathode which consists essentially of a mixture of organic charge-transfer complex and iodine. The cathode includes a current collector having a lead portion with an insulating coating positioned through the aperture in the encasing member. Optionally, the current collector may include an insulating frame around its periphery to prevent electrical contact with the anode. A lithium iodide electrolyte is coextensively positioned between and in contact with the inner surface of the encasing member and the cathode.

The method for making the cell includes forming a receiving vessel of lithium and positioning the cathode current collector therein. The cathode material is heated to a flowable consistency and the vessel is completely filled with the heated cathode material. The completely filled vessel is chilled to a temperature sufficient to solidify the heated material; and, while in the solidified state, the vessel is sealed by positioning a lithium cap on the solidified material and cold welding the cap under pressure to the receiving vessel to form the lithium anode encasing member. Second and third redundant encasements are effected by placing a thin layer of iodine-resistant cement and an outer layer of iodine resistant film (preferably a fluoropolymer), respectively, over the receiving vessel. These encasements provide additional electrical insulation from a hermetically sealed outer metal case finally positioned over the assembly.

4 Claims, 9 Drawing Figures

LITHIUM-IODINE CELLS AND METHOD FOR MAKING SAME

This is a continuation of application Ser. No. 564,755 filed Apr. 3, 1975, now abandoned.

FIELD OF THE INVENTION

The present invention relates to lithium-iodine primary cells and a method for making same, and, in particular, to a primary cell having a lithium anode encasing member for containment of the cathode and electrolyte which is coextensive with the inner surface of the encasing member.

BACKGROUND OF THE INVENTION

Primary cells having charge transfer complexes such as iodine-containing material are known. For example, cells utilizing iodine-containing charge transfer complexes as cathodes and anodes of selected divalent metals have been disclosed by Gutman et al, J. Electrochem. Soc. 114, 323 (1967). Also, high energy density batteries utilizing a lithium anode and cathode of organic materials such as polycyclic aromatic compounds, organic polymers, heterocyclic nitrogen containing compounds and the like and iodine have been disclosed, U.S. Pat. No. 3,660,163.

Improved cathode compositions comprising a mixture of iodine and poly-2-vinypyridine . $nI_2$ or poly-2-vinyquinoline . $nI_2$, where $n = 2-15$, have seen taught. See U.S. Pat. No. 3,674,562, incorporated herein by reference. Cathode material of the latter type is typically a pliable, plastic-like solid. In other applications the cathode material is viscous substance that has a proclivity to flow.

Since the lithium halide batteries are typically used with implantable prosthetics such as cardiac pacemakers, it is necessary that they be physically small, and highly reliable. Various lithium battery enclosures have been proposed to contain the iodine cathode material from flowing and forming a short circuit between the anode and cathode. For example, U.S. Pat. No. 3,723,183 a lithium battery enclosure is disclosed in which a lithium anode is formed as the inner surface of a steel battery container. The iodine-containing cathode material is then pressed into the lithium layer. A shoulder is thereafter formed on the lithium layer and precision fit with a cap to contain the cathode. The cap includes an aperture through which an insulated lead provides electrical contact with the cathode. A material such as epoxy is formed over the cap to hermetically seal the battery.

Enclosures such as the one described in U.S. Pat. No. 3,723,183 have a number of commercial disadvantages. For example, the voided space provided between the cathode material and cap physically enlarges the size of the battery as well as permits oxidation of the lithium material, even with dry air. Further, it is difficult in practice to maintain the cap receiving shoulder sufficiently clean to obtain a diffusion bond or weld when the cap is pressed thereon. Thus, there is no way to check whether the battery will leak until it has been completely assembled with the hermetic seal. A further disadvantage is that the outer case is necessarily the negative terminal of the cell since it is common with the lithium.

One commercially satisfactory method of assembling lithium-iodide cells utilizes an internal plastic encapsulating member to contain the active cell components. In these batteries, a lithium anode surrounded by the cathode material is encased in a plastic case which is fitted within a metal outer case. The plastic encasements, however, have two substantial disadvantages: (1) the plastic encasing material occupies space which could be preferentially used for the active cell material, and (2) the adhesive used to cement the plastic material closed is subject to attack by the active species from the electrolyte or cathode causing physical deterioration and/or a decrease in resistivity.

Accordingly, it is an object of the present invention to provide a lithium anode cell that minimizes the quantity of plastic to afford either a size reduction in the completed assembly or utilize more active components. It is a further object of the invention to provide a cell that has no air or void spaces, shows increased contact area between anode and electrolyte, and can be tested for leakage prior to complete assembly. Further, it is an object of the invention to provide a cell having increased voltage under load, decreased internal impedance, and a larger electrical capacity compared to plastic encased lithium anode cells of the same size.

SUMMARY OF THE INVENTION

The present invention provides a lithium-iodine primary cell that overcomes the disadvantages and inherent limitations of prior art cells and which is particularly well suited for use in prosthetic devices such as cardiac pacemakers. Generally, the primary cell of the present invention comprises a lithium anode encasing member having an aperture therethrough. A cathode is positioned within the anode encasing member and consists essentially of an organic charge transfer complex and iodine. The cathode preferably includes a current collector having a lead portion with an insulating coating thereon that is positioned through the aperture. The aperture may comprise a slit in the lithium or, alternatively, may be formed by enveloping the insulated cathode lead between folds in the lithium used in assembling the receiving vessel. In both cases, the lithium is bonded to the plastic insulator under pressure to form a seal. A lithium iodide electrolyte, preferably formed in situ, is coextensively positioned between and in contact with the inner surface of the anode encasing member and the cathode.

In a preferred embodiment, the lithium anode encasing member includes an anode current collector having a lead portion. The encasing member is provided with a layer of iodine-resistant cement and a thin plastic insulating coating, and the coated assembly is hermetically sealed in a metal protective case made, preferably, of stainless steel.

The cathode material is preferably a charge-transfer complex of organic material and iodine. Charge-transfer complexes are a well-known class of materials that have two components, one an electron donor, and the other an electron acceptor, that form weakly bonded complexes that exhibit electronic conductivity high than either component. The charge-transfer complexes are in chemical equilibrium with small amounts of free iodine that is available for electro-chemical reaction. Cathodes containing intimate mixtures of low-conductivity complexes with powdered graphite or inert metal have high conductivities and can provide performance comparable to cells using high-conductivity complexes. Suitable charge complexes may be prepared using an organic donor component such as polycyclic-aromatic compounds, e.g., pyrene, anthracene, and the like; organic polymers, for example, polyethylene, polypropylene, poyvinyls; or heterocyclic compounds containing nitrogen or sulphur, e.g., phenothiazine, phenazine, and the like. Preferably, the charge transfer complexes comprise a mixture of iodine and solid poly-2-vinyl pyridine . $I_2$ or poly-2-vinylquinoline . $I_2$.

The electrolyte is preferably lithium iodide which may be formed in situ by contacting the anode and cathode surfaces wherein the lithium reacts with iodine in the cathode to form a solid lithium iodide electrolyte layer that contacts both the anode and the cathode. Alternatively, the electrolyte includes a coating of lithium iodide or lithium halide on the lithium anode formed by reaction of the lithium with iodine or other halogen.

In a preferred embodiment of the invention, the lithium-iodine cell is made by forming a sheet of lithium metal into a receiving vessel having an aperture therethrough and an opening. The vessel is formed to include at least one extending portion having a shape that conforms dimensionally to the opening and which is adapted to sealingly close the opening. A chemically-resistant material, for example, expanded zirconium metal or rigid foil, is welded to a plastic-coated lead wire to form a cathode current collector. The cathode current collector is positioned, preferably, in the center of the formed vessel such that coated lead wire is securely located through the aperture. Alternative methods of accurately positioning the cathode lead comprise positioning the coated lead between the folds of lithium during the pressure forming of the lithium receiving vessel and/or heat sealing a plastic frame around the periphery of the cathode current collector where the frame is dimensioned to precisely fit the interior of the receiving vessel.

The cathode, preferably an organic charge transfer complex and iodine, is heated to a flowable consistency, for example, to between 200° and 225° F. The formed vessel is then completely filled with the heated cathode material to provide intimate contact with all of the inner surfaces of the lithium vessel and cathode current collector. The vessel is chilled, for example, to a temperature to between $-130°$ and $-65°$ E. to solidify the cathode material. While the cathode material is in the solidified state, the extending portion of the vessel is positioned in abutting relationship with the cathode material and the peripherial edges of the opening are pressed against the vessel and cold-welded to form the anode encasing member.

Other advantages of the present invention will become apparent from a perusal of the following detailed description of a presently preferred embodiment taken in connection with the accompanying drawings.

PRESENTLY PREFERRED EMBODIMENT

Figure 1:
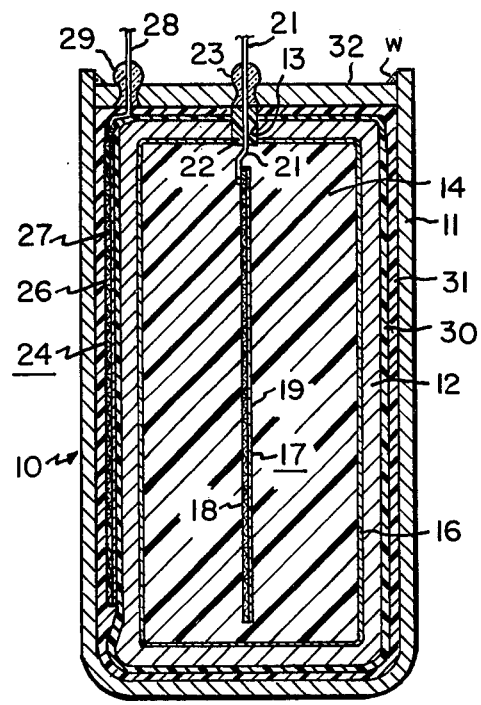
FIG. 1 is a sectional elevation of a lithium-iodine battery of the present invention.

Referring to FIG. 1, lithium-iodine cell 10 of the present invention is shown as hermetically enclosed within metal casing member 11, preferably of stainless steel. Cell 10 includes a lithium anode encasing member 12 having an aperture 13 at the top thereof. Cathode 14 comprising an iodine-containing organic charge-transfer complex, preferably, a mixture of iodine and solid poly-2-vinylpyridine . $nI_2$ or poly-2-vinylquinoline . $nI_2$ (where $n = 3-15$), is contained within lithium anode encasing member 12.

A lithium-iodide electrolyte 16 is coextensively positioned between and in intimate contact with the inner surface of lithium anode encasing member 12 and the outer surface cathode material 14. The lithium-iodide electrolyte 16 is formed spontaneously when the cathode material of cathode 14 is brought into contact with the inner surface of the lithium encasing member 12.

Cathode 14 includes cathode current collector 17. Cathode current collector 17 preferably comprises a metal screen 18, for example of expanded zirconium metal, spot welded to a metal foil 19, preferably of zirconium. Cathode current collector 17 includes a lead wire 21 having a plastic insulating coating 22 thereon. Lead 21 is positioned in aperture 13 and extends through glass-metal seal 23 in the top portion 32 of metal casing member 11 for external connection.

Lithium anode encasing member 12 includes anode current collector 24 preferably comprising a screen-like material, for example, zirconium screen 26, and a lithium foil 27 positioned thereover and press bonded to the outer surface of encasing member 12 to provide a lithium-to-lithium bond. Anode current collector 24 includes a lead wire 28 which is directed through glass-metal seal 29 to provide an external circuit connection.

Lithium anode encasing member 12, including anode current collector 24, is provided with a coating 30 of iodine-resistant cement, such as alpha-cyanoacrylate, to provide electrical insulation and to bond thereto a thin layer of insulating material 31 such as TFE Teflon®, Halar® or FEP Teflon®. Coating 31 is typically 0.0005 to 0.005 inches thick and is adapted to provide both electrical insulation between encasement member 12 and metal case 11, and a redundant encasement of the cathode or depolarizer material 14. Metal casing 11 includes a top portion 32 which is welded to the top of case 11 to provide a hermetic seal after receiving the lithium anode encasing member 12.

Figure 3:
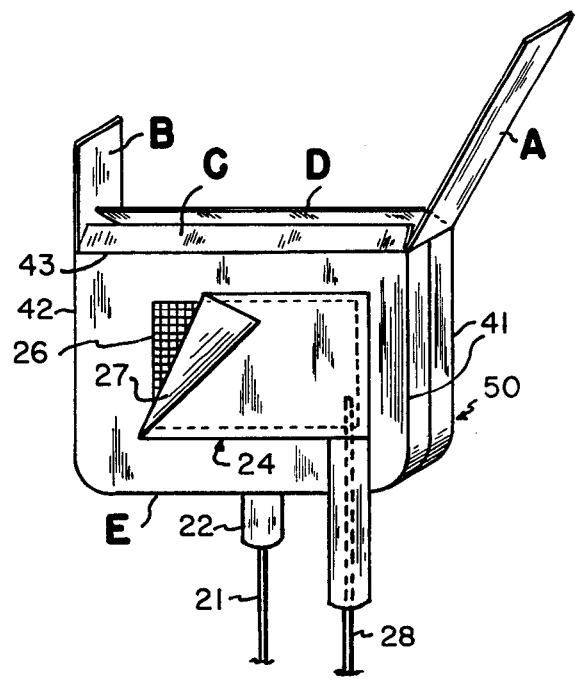
FIG. 3 is an isometric view of the lithium sheet of FIG. 2 formed as a receiving vessel.
Figure 2:
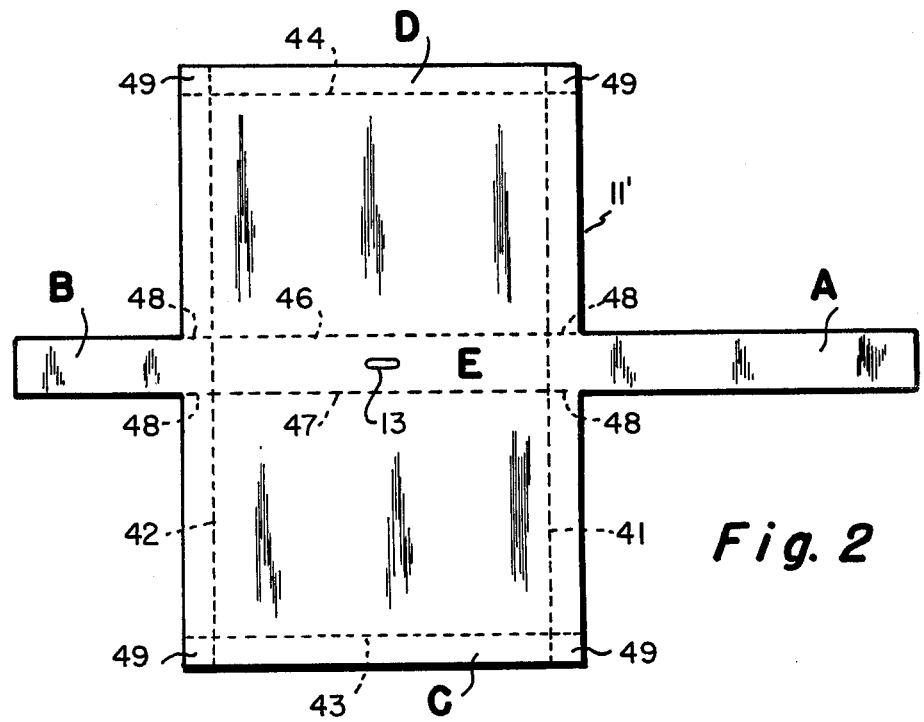
FIG. 2 is a plan view of the cut and fold lines of a sheet of lithium used to form the lithium anode encasing member.

With reference to FIGS. 2 and 3, a preferred method is shown and described for making the primary cell of the present invention. While the method discloses a cell of rectangular configuration, it is clear that the method may be modified in accordance with the teachings hereof to form a cell having any desired configuration, for example, a cylindrical cell. Referring to FIG. 2, in particular, a sheet of lithium foil 11' having a thickness of preferably 0.040 inches is cut into a rectangular pattern having a width of about 3.625 inches and a length of about 2.15 inches. The pattern includes two extending portions, A and B, having lengths of 3.158 inches and 1.893 inches, respectively, and a width of 0.388 inches.

Fold lines are preferably inscribed on lithium foil 11' to facilitate shaping the pattern into a receiving vessel. Metal foil 11', therefore, includes a first pair of fold lines 41 and 42 which are adapted to be folded to comprise the side walls of the receiving vessel. A second pair of fold lines 43 and 44 are provided to define flaps C and D, which are adapted to close the opening in the formed receiving vessel. These flaps preferably have a width equal to 0.388 inches. A third pair of fold lines 46 and 47 are provided which define end E. Centrally positioned in end E is aperture 13 extending therethrough and adapted to receive cathode lead 21. Four cuts 48 are provided along fold lines 46 and 47, each extending from the peripheral edge of foil 11' to the respective fold lines 41 and 42. Corner portions 49 defined by fold lines 41-44 are removed from foil 11' to dimensionally conform flaps C and D to the opening in the subsequently formed receiving vessel.

Prior to forming the receiving vessel, anode current collector 24 is fabricated on the outer surface of foil 11'. Anode collector 24 is made, for example, by using a zirconium expanded metal screen 26 approximately 0.005 inches thick by 1.50 by 1.00 inches and positioning said screen 26 on the outer surface of foil 11' as shown in FIG. 3. A rectangular piece of lithium foil 27, approximately 0.010 inches thick, is placed on top of screen 26 and pressed thereinto, bonding the lithium to lithium and embedding the zirconium screen into foil 11'. Preferably, wire lead 28 is welded to the screen prior to assembly.

Cathode current collector lead 21 having coating 22 is inserted in aperture 13. Lithium foil 11' is then folded along respective fold lines 41, 42, 46 and 47 to form receiving vessel 50, as shown in FIG. 3 and pressed at 5,000 pounds in die to cold weld the flaps together. During the pressing operation, coating 22 is bonded to lithium and a cement such as cyanoacrylate is preferably used at the point lead 21 passes through aperture 13 to insure maximum reliability.

To provide increased stability, cathode current collector 17 is preferably made of an expanded zirconium metal screen 18, having a thickness of approximately 0.005 inches and a dimension of 1.50 inches by 1.00 inches to which is spot welded a zirconium foil 19 having the same dimensions but of a thickness of 0.001 inches. A foil having a thickness of about 0.004 inches may be used as the current collector without screen 18. Lead 21 having fluoroplastic coating 22 is spot welded to the screen/foil current collector 17. Preferably, lead 21 is affixed to the periphery of aperture 13 by a plastic/metal cold weld achieved in the pressing operation of receiving vessel 50. The cementing of aperture 13 as set forth above provides a redundant seal.

Figure 4:
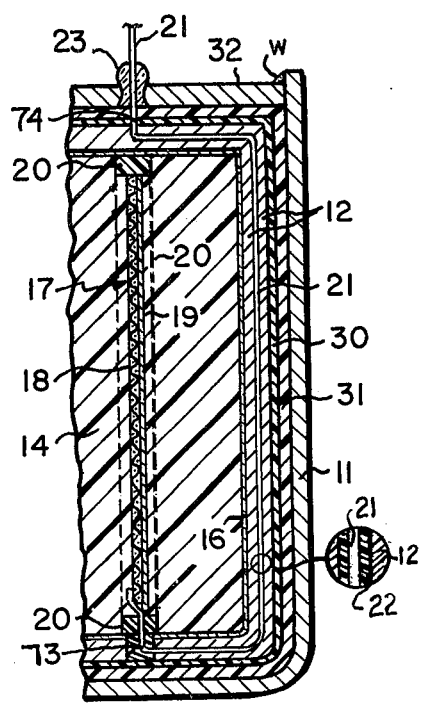
FIG. 4 is a partial elevation in section of an alternative cathode current collector for use in the battery shown in FIG. 1.

With reference to FIG. 4, current collector 17 preferably includes a fluoroplastic frame 20 heat sealed around the periphery of the screen/foil assembly. Frame 20 positions current collector 17 in receiving vessel 50 such that the outer peripheral surface of the frame is actually affixed to the inner surface of vessel 50. Lead 21 having a coating 22 extending from point 73 to 74 may be positioned between the folds of the lithium such that during the pressing operation the coated cathode lead bonds to the lithium between the folds as shown in FIG. 4. By so positioning the coated lead, any possible leakage path is maximized.

The cathode material is heated to a temperature of between 200° F. and 225° F. to provide a flowable consistency. Receiving vessel 50 (FIG. 3) is then completely filled with the heated cathode material and the electrolyte is formed in situ. The vessel is chilled, for example to between $-130°$ and $-65°$ F., to solidify the cathode material. Flaps C and D are folded and pressed against the solid cathode to thereby enclose it. A similar folding of flaps A and B is carried out. The cell is then placed in a chilled die and the top pressed at about 600 pounds to provide a cold weld between the flaps and first encasement. A layer of cement, preferably alpha-cyanoacrylate, is applied to the surfaces of the folded flaps and preferably over the entire outer surface of vessel 50 to provide a second encasement for the cathode material.

The completed cell is then encased in a Halar®, TFE Teflon® or FTP Teflon® film approximately 0.005 to 0.0005 inches thick. Preferably, an alpha-cyanoacrylate cement is used to seal the film to the lithium and provide a third barrier against cathode or depolarizer leakage. The cell is then fitted into stainless steel case member 11. A hermetic seal is made by welding top portion 32 to case 11 utilizing glass-metal seals 23 and 29 to seal loads 21 and 28, respectively.

Figure 5:
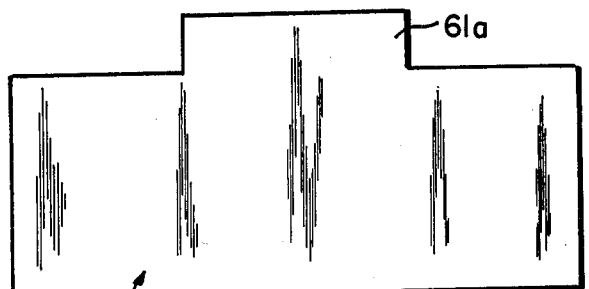
FIGS. 5 and 5a are plan views of a cut sheet of lithium used in an alternative embodiment of the invention.
Figure 5A:
Figure 6:
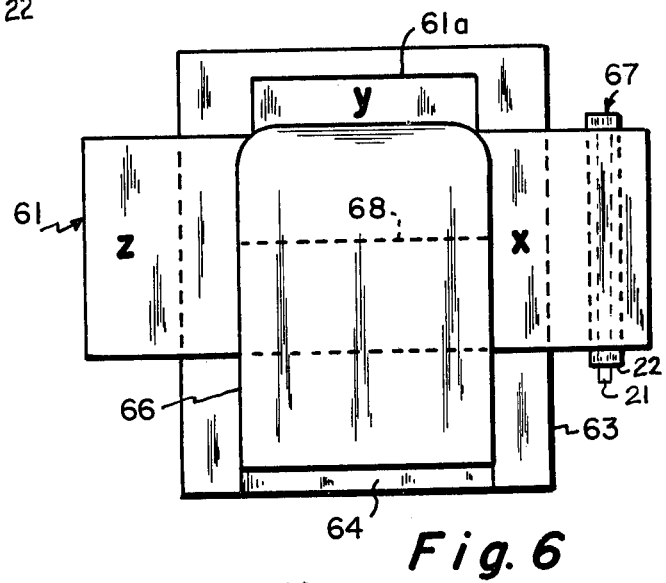
FIG. 6 is a plan view of a sheet of lithium of FIG. 5 positioned in a die used to press the folds into a receiving vessel.
Figure 7:
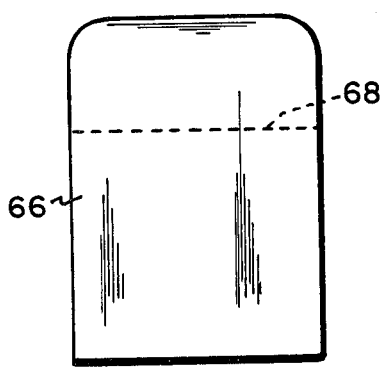
FIGS. 7 and 7a are front and side elevations of a cathode lead tool used in connection with the die shown in FIG. 6.

With reference to FIGS. 5 through 7, an alternative method is shown and described for assembling the primary cell of the present invention. Referring to FIG. 5, a sheet of lithium foil 61 having thickness of approximately 0.040 inches is cut into a substantially rectangular shape having a length of about 5.125 inches and width of about 2 inches. An extending portion 61a having a length of about 2 inches and width of 0.5 inches is provided. A second lithium foil member 62 is formed as shown in FIG. 5a having thickness of 0.040 inches, a length of 1.843 inches and width of about 0.437 inches. Second member 62 comprises a compression plate for the top of a formed receiving vessel.

Figure 7A:

Lithium sheet 61 is cleaned of any oxides and positioned in mold 63 having a depression 64 pressed with a die, not shown, to form a pocket that conforms to depression 64 and to provide flaps X, Y and Z as shown in FIG. 6. Positioned in the pocket formed in sheet 61 is a Teflon® cathode tool 66, FIGS. 7 and 7a, and flap X is folded thereover. Positioned in slot 68 of tool 66 is a current collector, such as current collector 17 of FIG. 4, with an attached coated lead 21 protruding. This lead is bent over the outer surface of folded flap X. (Lead 21 with coating 22 is shown diagrammatically positioned at 67 on flap X in FIG. 6 prior to folding only to show relative positioning.) Flaps Y and Z are then folded over lead 21 with coating 22.

After folding has been effected, the unit, including cathode tool 66, is turned over in the mold and an anode lead is positioned on the surface of the lithium that had been previously juxtaposed in depression 64 and covered with a rectangular sheet of lithium approximately 0.040 inches thick by about 1.625 inches in length and 1.0 inch in width. The assembly is then pressed flat at 5,000 pounds of pressure to cold weld the anode to the lithium and to form a receiving vessel.

The receiving vessel is removed from the mold and tested for the existence of a short between the cathode lead 21 and the lithium. A thin coating of alpha-cyanoacrylate cement is provided over the outer surface of the lithium. Thereafter, cathode tool 66 is removed, leaving cathode current collector 17 and lead 21 with coating 22 firmly positioned in the receiving vessel. In a preferred embodiment, collector 17 has previously been heat sealed to fluoroplastic frame 20. This frame aids in maintaining the position of collector 17. The vessel is then filled with the cathode complex material.

The filled vessel is then chilled to between $-130°$ F. and $-65°$ F. to solidify the cathode complex material. Cathode compression plate 62, FIG. 5a, is fitted into the top of the filled vessel and the edges of the vessel are folded over the plate permitting the other end of coated lead 21 to pass through. The top is then pressed at 600 pounds pressure using a ram, not shown, effecting a lithium-to-lithium cold weld. The unit is then coated with a thin layer of alpha-cyanoacrylate cement.

The lithium coated cell is thereafter positioned in an outer casing member and a header unit placed on top to encase the cell. The cathode and anode leads are sealed to the head by means of glass-metal seals in the same manner as described with reference to FIG. 1.

The following table provides a comparison of lithium cells of the present invention and prior art plastic encased lithium anode cells having the same outer physical dimensions. Both cells are of the formulation:

Li/LiI/poly (2-vinylpyridine) . $nI_2$.

|  | Lithium anode cell of the invention | Prior art plastic encased lithium and cell |
|---|---|---|
| Lithium area | 7.42 in$^2$ | 3.76 in$^2$ |
| Cathode weight | 45-50 g | 34-35 g |
| Open circuit voltage | 2.804 volts | 2.806 volts |
| Impedance at 1000 H$_z$ | 15 ohms | 18 Ω |
| Capacitance | 3 microfarads | 2 microfarads |
| Volts under 50 K Ω load | 2.787 | 2.795 |
| Volts under 1 K Ω load | 2.655 | 2.597 |
| DC resistance | 51 Ω | 78 Ω |
| Electrical capacity | 5.5 to 6.0 Amp. hr. | 4 Amp. hr |

Under load, lithium cells of the invention show a decreased polarization with time because of the increased lithium surface area.

While presently preferred methods of forming the lithium anode encasing member metal have been shown, it is clear that other methods, such as drawing, may be used. Notwithstanding the method used to form the lithium encasing member, it is necessary that the cathode material be heated to a flowable consistency and then chilled to solidify the material. By solidification, it is possible to completely enclose the cathode material, since the solidified cathode material provides the internal support necessary to cold weld and lithium flaps. Accordingly, while presently preferred embodiments of the invention have been shown and described in particularity, the invention may be otherwise embodied within the scope of the appended claims.

What is claimed is:

1. A lithium iodine primary cell comprising a lithium anode encasing member, a cathode material positioned within and filling said anode encasing member and consisting essentially of an organic charge transfer complex and iodine; a cathode current collector having a lead portion coated with an insulating material, said insulated portion extending from said collector to a first terminal and being embedded within a portion of the anode encasing member; a lithium iodine electrolyte coextensively positioned between and in contact with the entire inner surface of said anode encasing member and said cathode material; an anode current collector; and first and second terminals, said first terminal being in electrical contact with said cathode lead and said second terminal being in electrical contact with said anode current collector.

2. A lithium iodine cell as set forth in claim 1 wherein said cathode is selected from the group consisting of poly-2-vinylpyridine . $nI_2$ and poly-2-vinylquinoline . $nI_2$ $n = 2-15$.

3. A lithium iodine cell as set forth in claim 1 including a thin plastic sheathing positioned over the outer surface of anode encasing member and anode current collector.

4. A lithium iodine battery as set forth in claim 3 including an outer metallic casing hermetically encapsulating said plastic sheathed anode encasing member, said outer metallic casing including a pair of openings through which said lead portions of said anode and cathode current collectors are positioned, and a pair of seals for sealing said openings.

* * * * *